United States Patent [19]

Gartside

[11] 4,264,432
[45] Apr. 28, 1981

[54] PRE-HEAT VAPORIZATION SYSTEM

[75] Inventor: Robert J. Gartside, Auburndale, Mass.

[73] Assignee: Stone & Webster Engineering Corp., Boston, Mass.

[21] Appl. No.: 81,126

[22] Filed: Oct. 2, 1979

[51] Int. Cl.³ .............................................. C10G 9/16
[52] U.S. Cl. .................................. 208/48 R; 196/106; 203/88; 208/106; 208/361; 208/364; 585/500
[58] Field of Search ...................... 208/48 R, 106, 361, 208/364; 196/104–106; 203/88; 585/500

[56] References Cited

U.S. PATENT DOCUMENTS

| | | | |
|---|---|---|---|
| 3,992,285 | 11/1976 | Hutchings | 208/48 R |
| 4,085,034 | 4/1978 | Endo et al. | 208/48 R |
| 4,174,273 | 11/1979 | Cros et al. | 208/364 |

*Primary Examiner*—Delbert E. Gantz
*Assistant Examiner*—G. E. Schmitkons
*Attorney, Agent, or Firm*—Morgan, Finnegan, Pine, Foley & Lee

[57] ABSTRACT

A process and system for vaporizing heavy oil prior to thermal cracking to olefins, by flashing with steam in first mixer, superheating the vapor, and flashing in second mixer the liquid from first mixer.

7 Claims, 1 Drawing Figure

4,264,432

PRE-HEAT VAPORIZATION SYSTEM

BACKGROUND OF THE INVENTION

1. Field of the Invention

This invention relates to pre-heating hydrocarbon feedstock materials prior to cracking the feedstock. More specifically, the invention relates to the vaporization of heavy oils prior to pyrolysis cracking.

2. Description of the Prior Art

Production of olefins and, in particular, ethylene has been achieved to a great extent by thermally cracking hydrocarbon feedstock and rapidly quenching the cracked effluent to selectively produce the desirable olefins. Feedstock such as ethane, naphtha and similar materials have provided very desirable hydrocarbon feedstock for cracking to produce olefins.

Recently, the use of heavy oils, such as the vacuum tower distillates from crude oils and hydrocracker feedstocks have been used to produce olefins by thermal cracking or pyrolysis. Several problems attend the cracking of heavy oils to produce olefins. Regardless of the system used, whether it be pyrolysis performed in a tubular furnace or in a reactor tube by the use of heated particulate solids to provide the heat necessary for the endothermic reaction, the pretreatment of heavy oils has become difficult and expensive.

Therefore, it is desirable and, in fact, necessary as a practical matter to preheat the heavy oil or any liquid hydrocarbon feedstock to a reaction inlet temperature of 1,100° F. Typically, steam is used as a diluent and to provide the heat necessary to vaporize the feedstock to achieve the proper inlet reaction temperature and phase condition. At present, preheating of the hydrocarbon feedstock is achieved by flashing the hydrocarbon feedstock with steam at a relatively high temperature; i.e. 1,400° F. for heavy feed (1,053° F. for typical light feeds). Conventionally, the hydrocarbon liquid is first heated in indirect heat exchange relationship to about 440° to 500° F. The heated liquid is then mixed with the superheated steam and flashed to 1,100° F. from the vaporization mix temperature of 720° F. This flashing is necessary since liquid hydrocarbon can not be totally vaporized by indirect exchange without incurring significant fouling of the equipment. In the case of heavy oils, the steam to hydrocarbon ratio is necessarily about 1:1. Because of the nature of the heavy oil feedstock, a relatively high temperature (1,400° F.) and a high steam to hydrocarbon ratio of 1:1 is required to provide the necessary vaporization heat.

SUMMARY OF THE INVENTION

It is an object of this invention to provide a system for preheating and vaporizing heavy oils for use as feedstock to produce olefins.

It is another object of the present invention to provide a preheat and vaporization system for heavy oil which requires considerably less heat, energy and steam to achieve the reaction inlet temperature of 1,100° F.

Thus, the system and process of the present invention includes a section for initially heating and heavy oil to temperatures of about 440° to 700° F. Thereafter, the heated heavy oil is delivered to a mixing section wherein superheated dilution steam is mixed with the heavy oil and the heavy oil-steam mixture is flashed. The flashed mixture is then delivered to a separator wherein the overhead is separated from the liquid bottoms. The overhead contains all of the steam and a portion of the hydrocarbon. The equilibrium temperature in a separator is generally the range of 700° to 800° F. As such, the portion of the hydrocarbon flashed and taken with the steam overhead ranges up to 60 percent of the total hydrocarbon. The bottoms taken from the separator are then delivered to a mixer. The overhead is heated in a steam superheater to a temperature to about 1,100° to 1,150° F., the criticality being that the temperature must not reach cracking temperature since the gas phase passing through the superheater contains considerable hydrocarbon. The 1,100° F. steam-hydrocarbon mixture and the 700° to 800° F. liquid bottoms from the separator are mixed and flashed to provide a composite mixture of hydrocarbon and steam at about 1,000° F. The 1,000° F. mixture is delivered to the reactor or first passed through a knockout drum to remove any of the entrained liquid.

DESCRIPTION OF THE DRAWING

The drawing depicts the system provided to vaporize heavy oil.

DESCRIPTION OF THE PREFERRED EMBODIMENT

Figure 1:
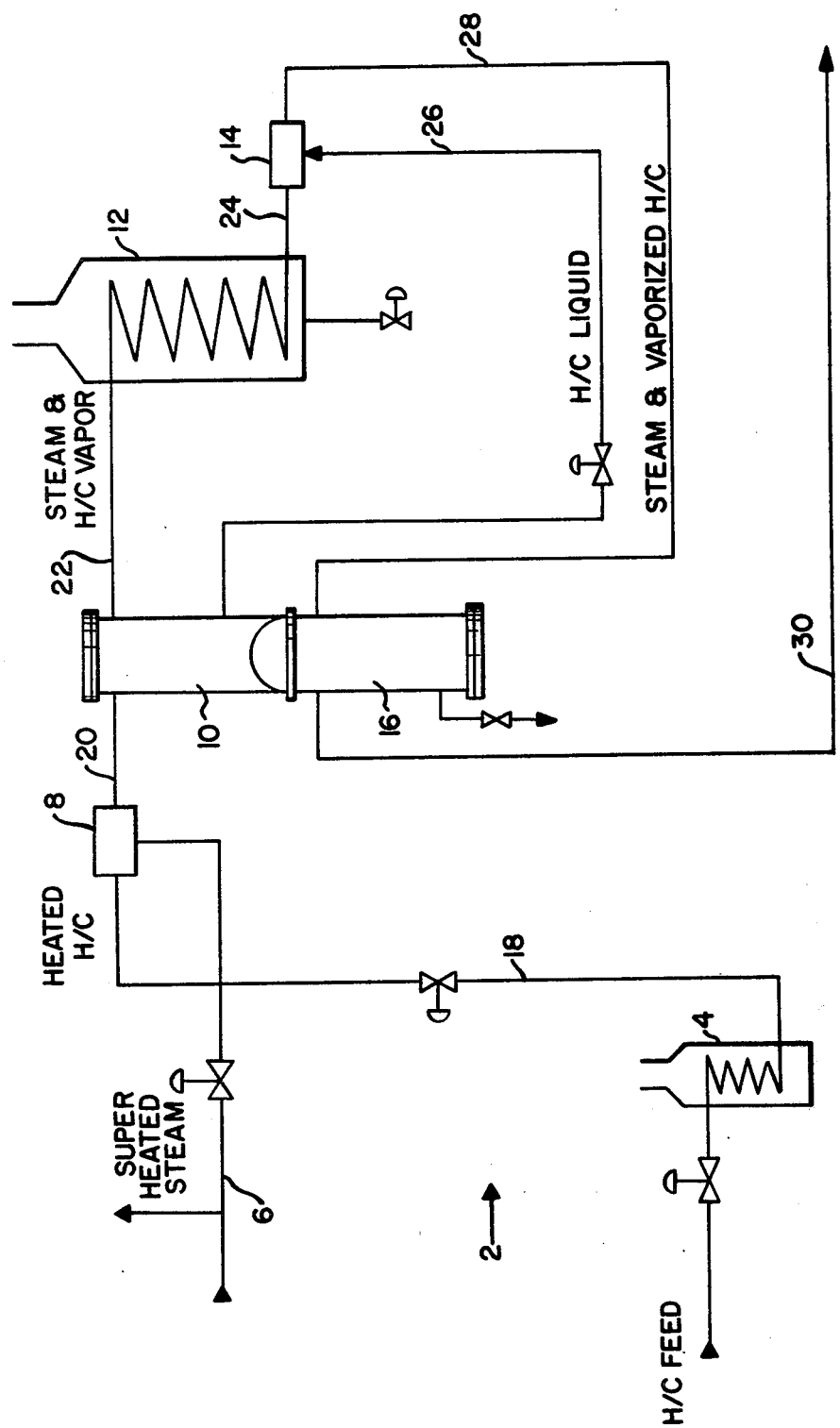

The system 2 and process of the invention as shown in the drawing depicts the various stages at which the hydrocarbon and steam are mixed and heated to effect a resultant vaporized hydrocarbon feed suitable for delivery to a hydrocarbon cracking unit.

The system 2 is comprised of essentially a liquid feed heater 4, a mixer 8 for flashing steam and the heated feedstock, a separator 10 to separate the flashed gas and liquid, a vapor feed superheater 12, and a second mixer 14 for flashing. The system also preferentially includes a knock-out drum 16 for the preheated vapor.

The liquid feed heater 4 is provided for heating the hydrocarbon feedstock such as desulfurized Kuwait HGO to initially elevate the temperature of the feedstock.

The initial mixer 8 is used in the system 2 to initially flash superheated steam from a steam line 6 and the heated feedstock delivered from the liquid feed heater 4 by a line 18.

The system separator 10 is to separate the liquid and vapor produced by flashing in the mixer 8. Separated gas is discharged through a line 22 from the separator overhead and the remaining liquid is discharged through a line 26.

A vapor feed superheater 12 heats the gaseous overhead from the line 22 to a high temperature and discharges the heated vapor through a line 24.

The second mixer 14 is provided to flash the vaporized gaseous discharge from the vapor feed superheater 12 and the liquid bottoms from the separator 10, thereby vaporizing the composite steam and feed initially delivered to the system 2.

A knock-out drum 16 is employed to remove any liquid from the flashed vapor discharged from the second mixer 14 through the line 28. The liquid-free vapor is delivered to a reactor through the line 30.

In the process, the heavy oil liquid hydrocarbon feedstock is first heated in the liquid feed heater 4 to a temperature of about 440° to 700° F. The heated heavy oil hydrocarbon feedstock is then delivered through the line 18 to the mixer 8. Superheated steam from the line 6 is mixed with the heated heavy oil hydrocarbon feedstock in the mixer 8 and the steam-heavy oil mixture is flashed to about 700° to 800° F. For lighter feedstock the flashing temperature will be about 500° to 600° F., and for heavier feedstock the flashing temperature will be about 700° to 900° F.

The flashed mixture of steam and hydrocarbon is sent to the system separator 10 wherein the vapor or gas is taken overhead through the line 22 and the liquid is discharged through the line 26. Both the overhead vapor and liquid bottoms are in the temperature range of about 700° to 800° F. The temperature level and percent of hydrocarbon vaporized are determined within the limits of equipment fouling criteria. The vapor stream in the line 22 is comprised of essentially all of the steam delivered to the system 2 and a large portion of the heavy oil hydrocarbon feedstock. Between 30% and 70% of the heavy oil hydrocarbon feedstock supplied to the system will be contained in the overhead leaving the separator 10 through the line 22.

The steam-hydrocarbon vapor in the line 22 is delivered to the system vapor feed superheater 12 wherein it is heated to about 1,030° F. The heated vapor is taken from the vapor feed superheater 12 through the line 24 and sent to the second mixer 14. Liquid bottoms from the separator 10 is also delivered to the second mixer 14 and the vapor-liquid mix is flashed in the mixer 14 to a temperature of about 1,000° F.

The flashed vapor is then sent downstream through the line 28 to the knock-out drum 16 for removal of any liquid from the vapor. Finally, the vaporized hydrocarbon feed is sent through the line 30 to a reactor.

An illustration of the system pre-heat process is seen in the following example.

A Nigerian Heavy Gas Oil is preheated and vaporized in the system 2 prior to delivery to a reactor. The Nigerian Heavy Gas Oil has the following composition and properties:

| Elemental Analysis, Wt. % | | Properties | |
|---|---|---|---|
| Carbon | 86.69 | Flash Point, F. | 230.0 |
| Hydrogen | 12.69 | Viscosity, SUS 210 F. | 44.2 |
| Sulfur | .10 | Pour Point, F. | +90.0 |
| Nitrogen | .047 | Carbon Residue, Ramsbottom | .09 |
| Nickel | .10 | Aniline Point, C. | 87.0 |
| Vanadium | .10 | | |
| Distillation | | | |
| Vol. % | | | |
| IBP | | | |
| 10 | 669.2 | | |
| 30 | 755.6 | | |
| 50 | 820.4 | | |
| 70 | 874.4 | | |
| 90 | 944.6 | | |
| EP | 1,005.8 | | |

3,108 pounds per hour of the Nigerian Heavy Gas Oil is heated to 750° F. in the liquid feed heater 4 and delivered at a pressure of 150 psia to the mixer 8. 622 pounds per hour of superheated steam at 1,100° F. is simultaneously delivered to the mixer 8. The pressure in the mixer is 50 psia.

The superheated steam and Heavy Gas Oil are flashed in the mixer 8 to a temperature of 760° F. wherein 60° of the Heavy Gas Oil is vaporized.

The vapor and liquid from the mixer 8 are separated in the separator 10. 622 pounds per hour of steam and 1,864.8 pounds per hour of hydrocarbon are taken in line 22 as overhead vapor. 1,243.2 pounds per hour of hydrocarbon are discharged through the line 26 as liquid and sent to the mixer 14.

The mixture of 622 pounds per hour of steam and 1,864.8 pounds per hour of hydrocarbon are superheated in the vapor superheater 12 to 1,139° F. and delivered through line 24 to the mixer 14. The mixer 14 is maintained at 45 psia.

The 1,243.2 pounds per hour of liquid at 760° F. and the vaporous mixture of 622 pounds per hour of steam and 1,864.8 pounds per hour of hydrocarbon are flashed in the mixer 14 to 990° F.

The vaporization of the hydrocarbon is effected with a steam to hydrocarbon ratio of 0.2. The heat necessary to vaporize the hydrocarbon and generate the necessary steam is 2.924 MM BTU/hr.

The same 3,108 pounds per hour of Nigerian Heavy Gas Oil feedstock vaporized by a conventional flashing operation requires steam in a 1:1 ratio to maintain a steam temperature of 1,434° F. The composite heat to vaporize the hydrocarbon and generate the necessary steam is 6.541 MM BTU/hr. In order to reduce the input energy in the conventional process to the same level as the present invention, a steam temperature of 3,208° F. is required, which temperature is effectively beyond design limitations.

I claim:
1. A process for pre-heating heavy oil hydrocarbon feedstock comprising:
   a. heating the liquid heavy oil hydrocarbon feedstock;
   b. initially flashing the heated liquid heavy oil hydrocarbon feedstock with steam;
   c. separating the vapor and liquid phases of the flashed liquid heavy oil hydrocarbon feedstock-steam mixture;
   d. superheating the vapor phase of the flashed liquid heavy oil hydrocarbon feedstock-steam mixture; and
   e. flashing the superheated vapor and the liquid phase of the originally flashed liquid heavy oil hydrocarbon feedstock-steam mixture.

2. A process as in claim 1 wherein the initial flashing of the steam and the liquid heavy oil hydrocarbon is at a temperature of 500° to 900° F., the vapor from the initial flashing is superheated to about 1,100° F. and the superheated vapor and liquid from the initial flashing step is again flashed to about 1,000° F.

3. A process as in claim 2 wherein the liquid heavy oil is preheated to 440° to 700° F.

4. A process as in claim 2 further comprising the step of removing liquid from the flashed superheated vapor and liquid produced in the initial flashing step.

5. A process as in claim 2 wherein the initial flashing of the steam and the liquid heavy oil hydrocarbon is at a temperature of 700° to 800° F.

6. A system for pre-heating heavy oil hydrocarbon feedstock comprising;
   a. means for preheating the liquid heavy oil hydrocarbon;
   b. a first mixer for flashing the heated liquid heavy oil hydrocarbon and steam;
   c. a vapor feed superheater for heating the vapors from the first mixer to about 1,030° F.; and
   d. a second mixer for flashing the superheated vapor and the liquid from the first mixer.

7. A system as in claim 6 further comprising means for removing liquid from the flashed superheated vapor and liquid from the first mixer.

* * * * *